(12) United States Patent
Schweid (10) Patent No.: US 8,055,093 B2
(45) Date of Patent: Nov. 8, 2011

(54) METHOD AND SYSTEM FOR NOISE LEVEL DETECTION IN IMAGE DATA

(75) Inventor: Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 880 days.

(21) Appl. No.: 12/101,947

(22) Filed: Apr. 11, 2008

(65) Prior Publication Data

US 2009/0257673 A1    Oct. 15, 2009

(51) Int. Cl.
*G06K 9/40*    (2006.01)
(52) U.S. Cl. ........................................ 382/275; 348/666
(58) Field of Classification Search .................. 327/555, 327/559; 348/666; 358/3.26; 375/E7.19; 382/263, 275
See application file for complete search history.

(56) References Cited

U.S. PATENT DOCUMENTS

| | | | |
|---|---|---|---|
| 4,573,070 A | 2/1986 | Cooper | |
| 5,923,775 A | 7/1999 | Snyder et al. | |
| 6,181,829 B1 | 1/2001 | Clark et al. | |
| 6,549,658 B1 | 4/2003 | Schweid et al. | |
| 6,760,482 B1 * | 7/2004 | Taubman | 382/240 |
| 6,847,737 B1 * | 1/2005 | Kouri et al. | 382/260 |
| 6,947,597 B2 | 9/2005 | Lin et al. | |
| 7,437,013 B2 | 10/2008 | Anderson | |
| 7,570,831 B2 | 8/2009 | Shaked et al. | |
| 7,755,802 B2 * | 7/2010 | Tai et al. | 358/3.24 |
| 2003/0053708 A1 | 3/2003 | Kryukov et al. | |
| 2005/0244075 A1 | 11/2005 | Shaked et al. | |
| 2009/0257674 A1 | 10/2009 | Schweid | |
| 2009/0257675 A1 | 10/2009 | Schweid | |

OTHER PUBLICATIONS

An unofficial file history for U.S. Appl. No. 12/101,944, filed Apr. 11, 2008.
An unofficial file history for U.S. Appl. No. 12/101,948, filed Apr. 11, 2008.
An Unofficial Prosecution History Between Apr. 8, 2010 and Aug. 1, 2011 for U.S. Appl. No. 12/101,944, filed Apr. 11, 2008, Published Oct. 15, 2009, As US-2009-0257674-A1; Inventor: Stuart A. Schweid.
Lee, Jong-Sen; "Digital Image Smoothing and the Sigma Filter;" *Computer Vision, Graphics, and Image Processing*, 24, 255-269 (1983).

* cited by examiner

*Primary Examiner* — Gregory F Cunningham
(74) *Attorney, Agent, or Firm* — Michael J. Nickerson; Basch & Nickerson LLP (57) ABSTRACT

A system determines the noise level of image data by high pass filtering image data. Absolutes values of the high pass filtered image data are determined. Thereafter, multiple mean values for absolute values less than a predetermined number of threshold values are determined. Based upon the determined mean values, a plurality of estimated mean values is calculated, each estimated mean value being calculated from a combination of two determined mean values. The noise of the image is determined from a combination of the minimum estimated mean value and the maximum estimated mean value. This noise can be optionally used by a sigma filter, at Step S740, to sigma filter the image data.

20 Claims, 13 Drawing Sheets

| 1 | 2 | 1 |
|---|---|---|
| 2 | 4 | 2 |
| 1 | 2 | 1 |

METHOD AND SYSTEM FOR NOISE LEVEL DETECTION IN IMAGE DATA

BACKGROUND

Often it is desired to improve the quality of an original image by utilizing various digital processing techniques. While there exist many software programs that allow a person to perform a wide variety of processing on a digital image, these programs require intensive personal input and often a high level of training to be used effectively. Consequently, there has been a parallel development of techniques that can automatically analyze a digital image and, without any human involvement, improve the image quality.

One particular problem that is commonly encountered is the presence of noise in a digital image. This noise can arise for a variety of reasons and includes both systematic or regular noise and random noise. A number of techniques have been devised to automatically remove noise from a digital image. One common technique is to simply apply some sort of low pass or averaging filter to the image. While this technique and similar techniques are effective in reducing or eliminating noise, simple filtering techniques suffer from the disadvantage that simple filtering also tends to blur the image, reducing its visual quality.

One conventional method for reducing or eliminating noise while avoiding the problem of blurring the image utilizes a sigma filter. The sigma filter works by replacing the value of a pixel with the average of those neighboring pixels that are relatively close to its value. This distance is usually taken to be related to the variance of the image, and hence the noise level. The sigma filter has the advantage of preserving high frequency detail in the image while removing noise.

However, the sigma filter has the disadvantage that the filter kernel needs to be relatively large for the filter to be effective. The large filter requires more extensive computing resources and time, thereby making the sigma filter less desirable.

Moreover, the noise within the image data needs to be detected/determined to enable proper sigma filtering wherein the sigma filtering enables noise removal.

Automatic noise removal requires the determination of the noise level in a given image. This detected noise level can be used to set parameters of a sigma filter that is applied to the image. Accurate determination of the noise level ensures that image noise is effectively attenuated, while allowing the image content to be virtually unaffected.

Conventionally, the noise is measured by calculating the sample standard deviation of a high pass filtered version of the image. The problem is that this estimate is highly contaminated by image content. A threshold could be used to ignore very large deviations, but the estimated sigma becomes very sensitive to this threshold.

Therefore, it would be desirable to implement a filtering process that realizes the advantages of a sigma filter, which is reducing or eliminating noise while avoiding the problem of blurring the image, but is more economical in the computing requirements needed to implement it.

Therefore, it would also be desirable to implement a noise level detection/determination process which is not highly contaminated by or sensitive to image content.

BRIEF DESCRIPTION OF THE DRAWING

The drawings are only for purposes of illustrating various embodiments and are not to be construed as limiting, wherein.

DETAILED DESCRIPTION

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 1:
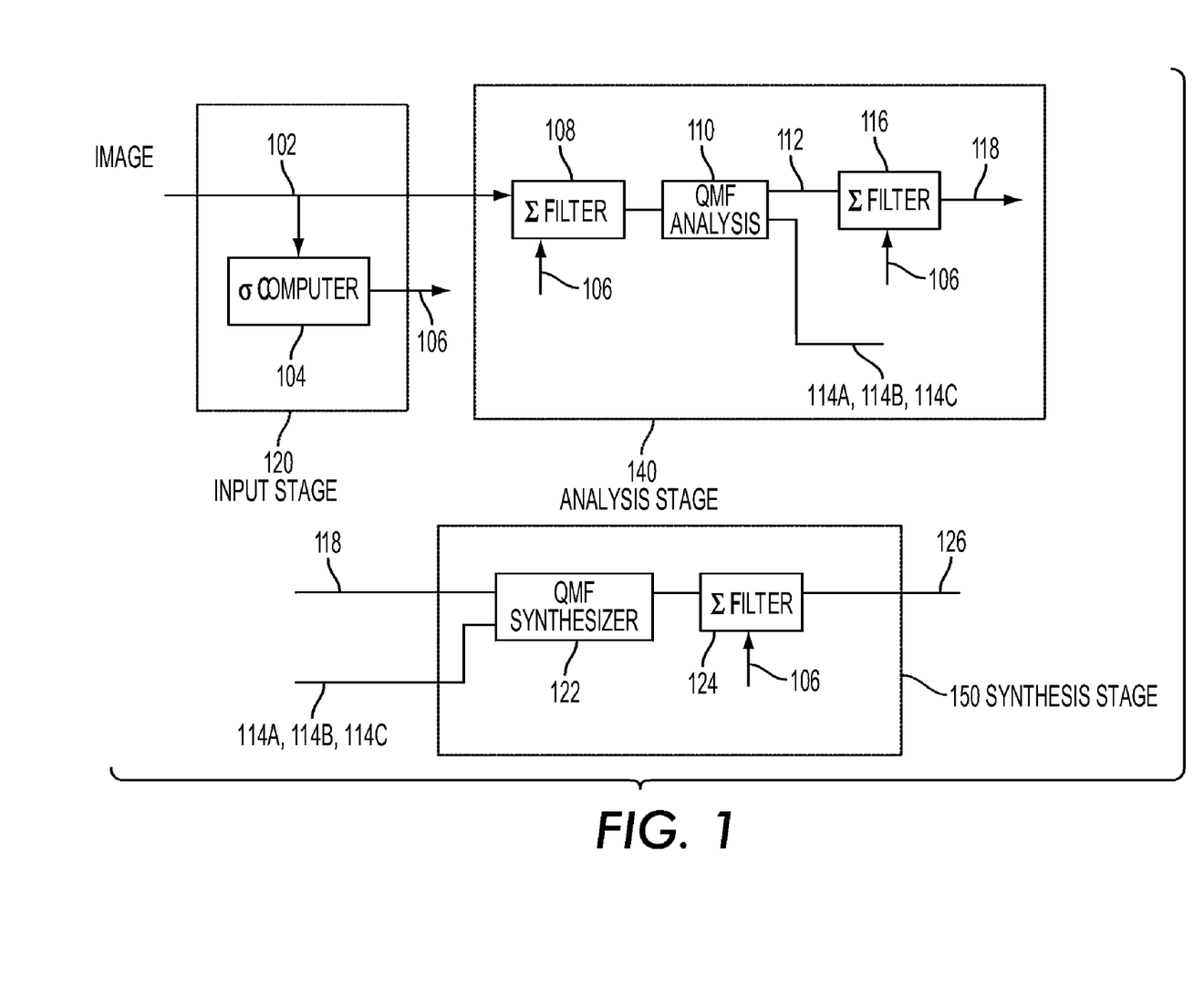
FIG. 1 illustrates a block diagram of a filter for reducing or eliminating noise in a digital image.

FIG. 1 illustrates a block diagram of a filter for reducing or eliminating noise in a digital image. The filter is composed of an input circuit 120, an analysis circuit 140, and a synthesis circuit, 150. As illustrated in FIG. 1, a digital image 102 is input to input circuit 120. As part of the image input, a sigma value, 106, is computed from properties of the image in the sigma calculation circuit, 104. These properties might include the variance of the image or other numerical values related to the noise content of the image. The sigma calculation circuit may include as part of the calculation some sort of high pass filter as well. The value of sigma (106) that is computed from the input image is used for all subsequent sigma filtering for this image. Although it is possible to use a common sigma value for all images, the improvement in image quality is greater if the sigma value is computed for each image individually to take full advantage of the actual noise levels and other properties of the image, which are different for different images.

In the analysis stage 140, the input image is first sigma filtered in a sigma filtering circuit 108 using the sigma value 106 previously computed in the sigma calculation circuit 104. A more detail explanation of the determination of the noise level used to determine the sigma value(s) is provided below.

After the sigma filtering is done, the image is processed by an analysis filter 110.

Typically, this filter is part of a quadrature mirror filter set. This filter might be a filter using a wavelet basis, for example, the Haar wavelet basis. The analysis filter set 110 consists of a low pass or approximation filter and a set of high pass or detail filters, usually three in number.

The output of the analysis filter 110 is four sub images (112, 114A, 114B, and 114C). All four sub images (112, 114A, 114B, and 114C) are at one half the resolution of the input image, that is each subimage is decimated by a factor of two.

The first of the four sub images (112), the output of the low pass or approximation part, is an image where each pixel represents the low frequency content of the image. The other three sub images (114A, 114B, and 114C), the output of the three high pass filter parts, represent the higher frequency detail present in the original image.

Typically, two of these sub images may represent the detail with an emphasis on two orthogonal directions in the original image while the third detailed sub image may represent the detail at some third angle with respect to the first two orthogonal directions.

In prior art implementations, the detailed images have been modified in some way. For example, in prior art implementations, the detail images have been thresholded to remove small details that are typically noise. Alternatively, the detail images may be quantized in some way. These approaches often introduce artifacts into the filtered image.

The details of the artifacts depend on the specific analysis filter used; for example, if a Haar basis is used, variations in the detail image can result in image blockiness, while other methods can cause ringing at edges.

In contrast, as illustrated in FIG. 1, only the approximation image 112 is filtered. The approximation image 112 is passed through another sigma filtering circuit, 116. This produces a modified approximation image 118. The detail sub images 114 are left unmodified.

As illustrated in FIG. 1, in the synthesis circuit, 150, a synthesis filter 122 is applied to recombine the detail sub images (114A, 114B, and 114C) and the modified approximation image 118. The synthesis filter is the complement of the analysis filter of the quadrature mirror filter pair. The output of the synthesis filter 122 is optionally further sigma filtered in by another sigma filter 124, thereby resulting in a final filtered image 126.

It is noted that it is more effective to choose the sigma of the sigma filter based upon image statistics for each image. Having an image dependent sigma allows aggressive filtering in images with a lot of noise and light filtering in high quality originals. One effective procedure is to high pass filter the image and to use its standard deviation to set the sigma of the filter. When calculating the standard deviation, large values are ignored, as these are assumed to be the result of image content, not noise.

As previously mentioned, sigma filters are slow because sigma filters typically use a relatively large filter kernel of sizes like 15×15. A large kernel means that the processing needed to implement the sigma filter is relatively large and hence slow. For example, for a 15×15 kernel, at each pixel the computation includes the contributions of 225 nearby pixels to the filter output.

Figure 2:
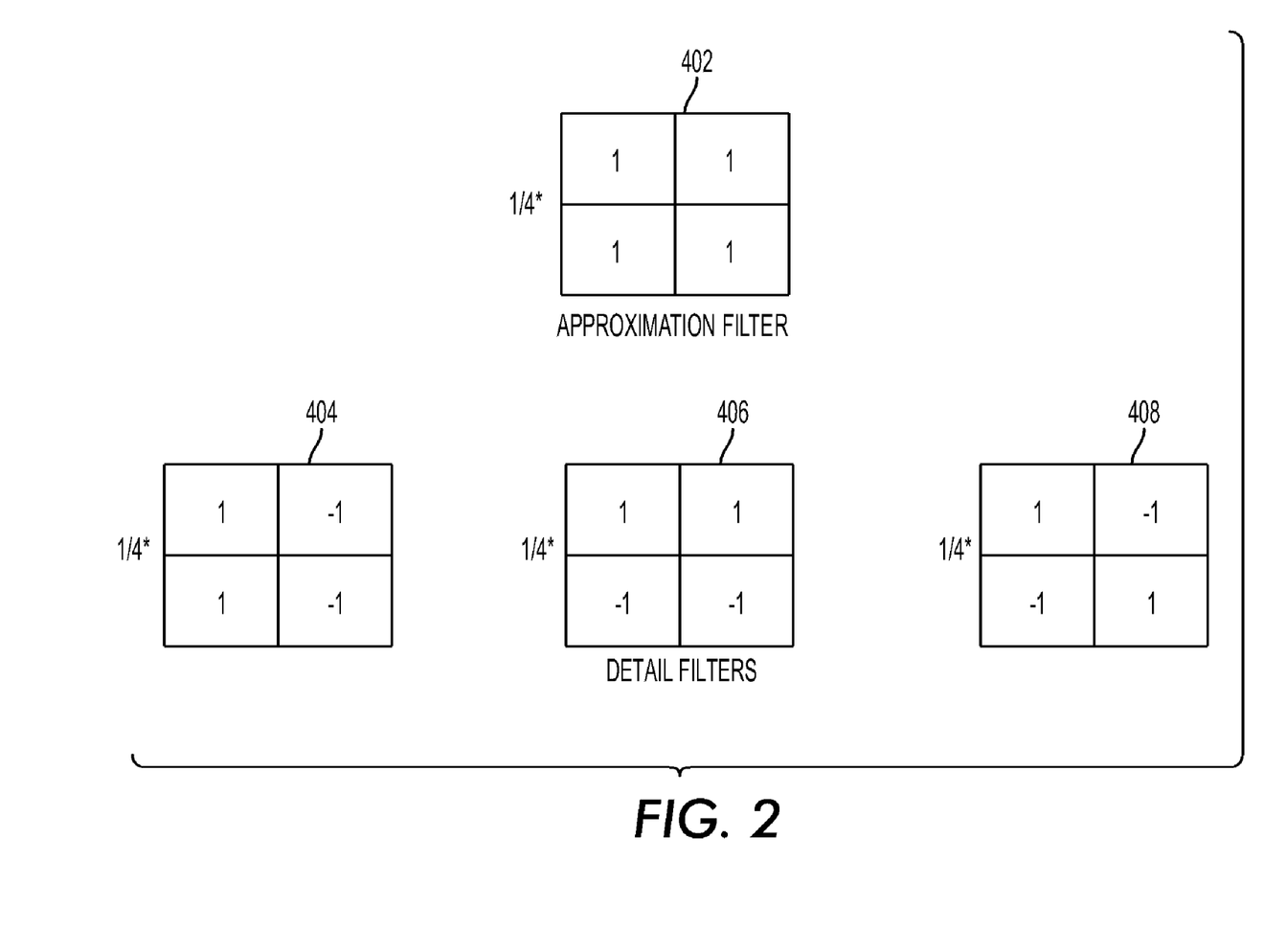
FIG. 2 illustrates a set of analysis filter kernels.

In contrast, the sigma filter, described above, utilize a small relatively kernel wherein even a filter kernel as small as 3×3 is effective in reducing image noise. This reduction in the filter kernel size corresponds to a significant reduction in computing requirements which typically scale roughly as the square of the kernel size. Since only the approximation part of the analyzed image is filtered, a simpler set of coefficients for the analyzer filter can be used. For example, a 2×2 Haar basis consisting of the filter kernels shown in FIG. 2 works well. The approximation filter kernel 202 is a simple average, while the three detail filter kernels 204, 206, and 208 filter the horizontal, vertical, and diagonal details of the image.

When only the approximation part of the analyzed image is filtered, all noise that makes its way into the detail sub images will not be filtered from the image. Thus, the sigma filter 106, as illustrated in FIG. 1, removes substantially all noise associated with the frequency band of the detail sub images before the analysis filter 110 or the noise will never be removed.

An example of a sigma filter to substantially remove all noise associated with the frequency band of the detail sub images before the analysis filter 110 would have a frequency response that has small gain (i.e. large attenuation) when the analysis filter 110 has large gain, since the analysis filter 110 is the filter whose output is the detail sub images.

In general, the sigma filter may be a complementary filter to the analysis filter. If the analysis filter is a quadrature mirror high pass filter, the sigma filter may be a quadrature mirror low pass filter.

Figure 3:
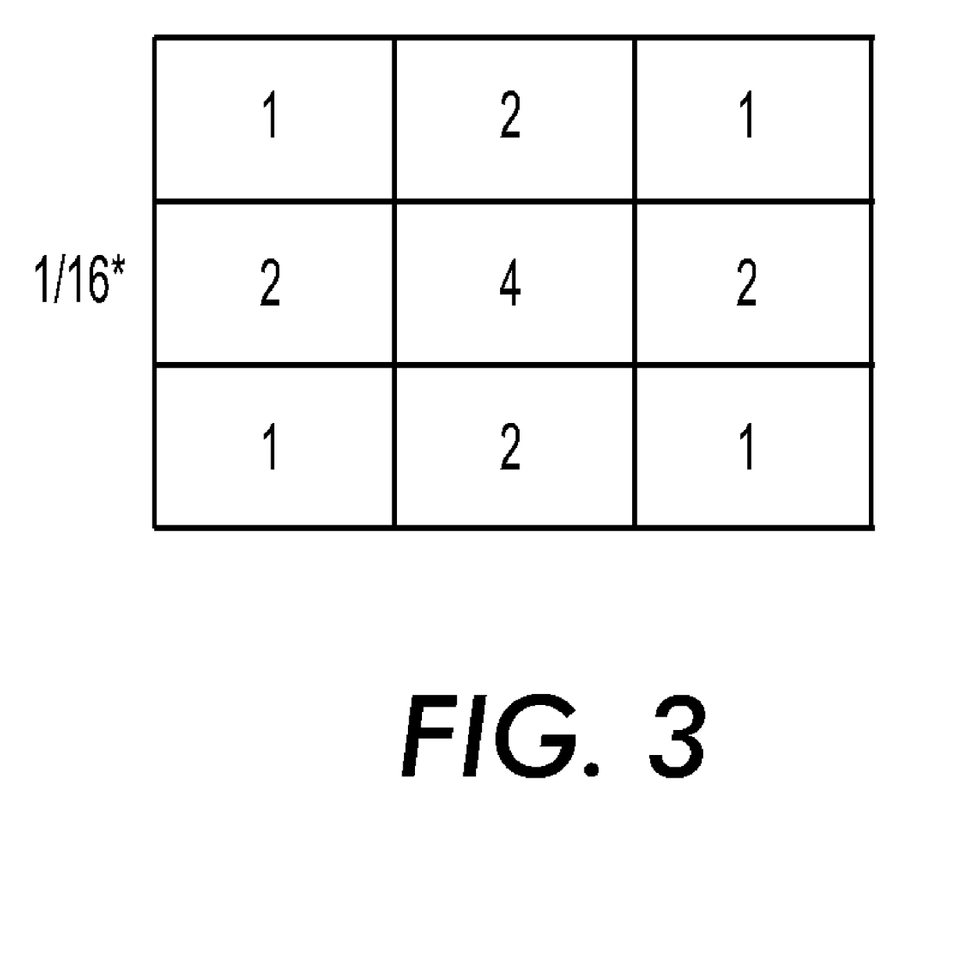
FIG. 3 illustrates a small sigma filter kernel.

As noted above, the sigma filter kernel can be as small as 3×3. This size provides sufficient high frequency rejection and is centered on the pixel of interest. A filter kernel, which meets these requirements and can be implemented by simple shift and add operations, as shown in FIG. 3. The shift and add feature means that the hardware implementation is particularly simple.

The implementation, as shown in FIG. 1, uses only one stage of filtering. However, recursively repeating the analysis stages may be utilized. The number of stages is arbitrary and is chosen based upon how much filtering is desired in the image.

For example, if the original image is at a resolution of 600 lpi and it is desired to filter to a level of about 100 lpi, three stages of filtering would suffice. Three stages would reduce the effective resolution of the approximation image from 600 to 300 to 150 then to 75 lpi as the image passes through the three stages.

With respect to computing efficiency, it is noted that each stage takes only ¼ of the time to perform when compared with the previous stage because of the decimation by two. It is further noted that increasing the number of stages makes the filter equivalent to a much larger single stage sigma filter. It can be shown that the equivalent filter size is given by: $4 * 2^{stages} - 1$. This means that for two stages, an effective filter size of 15×15 is realized.

By comparison, if a 15×15 sigma filter is implemented directly, the 15×15 sigma filter would take 25 times as long as a single stage 3×3 filter. Thus, the descried system and methodology requires only about 32% more time than a single stage 3×3 filter.

Figure 4:
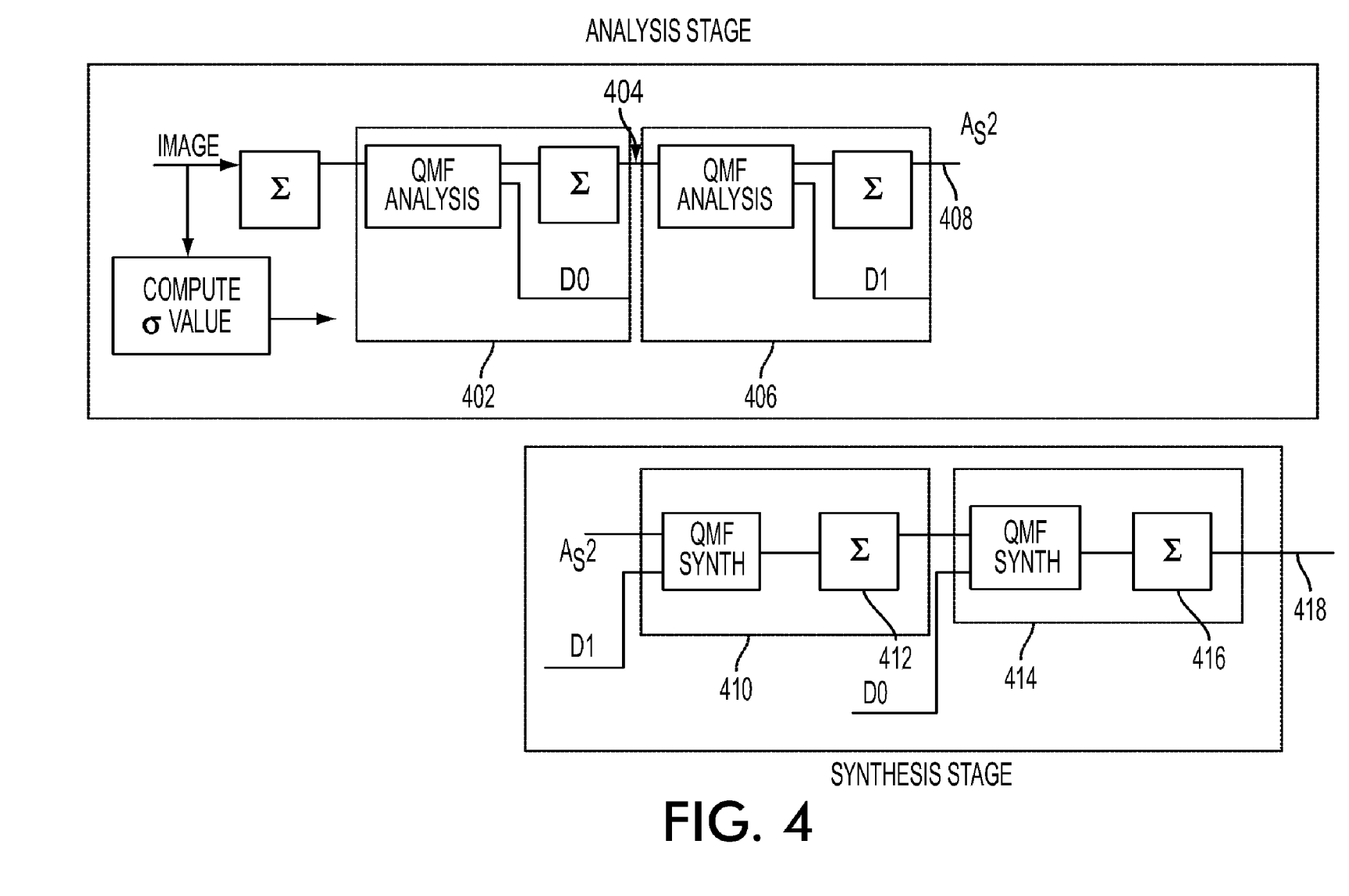
FIG. 4 illustrates a block diagram of another filter for reducing or eliminating noise in a digital image.

FIG. 4 shows an extension of FIG. 1 to multiple stages. The input stage is identical to the input stage of FIG. 1. As illustrated, a first analysis filter stage 402 produces four sub images, an approximation image and three detail images. The approximation image is processed by a second analysis filter stage 406 to produce four additional sub images, a second approximation image and three additional detail images. Although FIG. 4 illustrated only two stages, the concept can be extended to any number of stages.

The output 408 (approximation image or approximation part) of the last analysis stage (406) is passed to a synthesis filter 410. The detail sub images D1 (detailed part of the last stage) is passed into the detailed part of the synthesis stage 410, while the approximation part is passed to the approximation part of the synthesis filter in stage 410.

The output of synthesis stage 410 can be optionally sigma filtered in by a sigma filter 412. The synthesis process may continue in another synthesis stage 414 wherein the output of synthesis stage 410 is combined with the detailed sub images D0 from the analysis filter stage 402. The output of synthesis stage 410 can be optionally sigma filtered in by a sigma filter 416 producing the final filtered image 418.

It is noted that the analysis process of FIG. 4 may included many stages. It is further noted that the synthesis process should include a number of stages equal to the number of stages in the analysis process. With respect to the synthesis process, each stage receives a detail part from the stages of the analysis process. The correspondence of the detail parts to the appropriate synthesis stage is last produce, first to be synthesized. In other words, the detail parts are fed to the synthesis stages in reverse order of generation.

Figure 5:
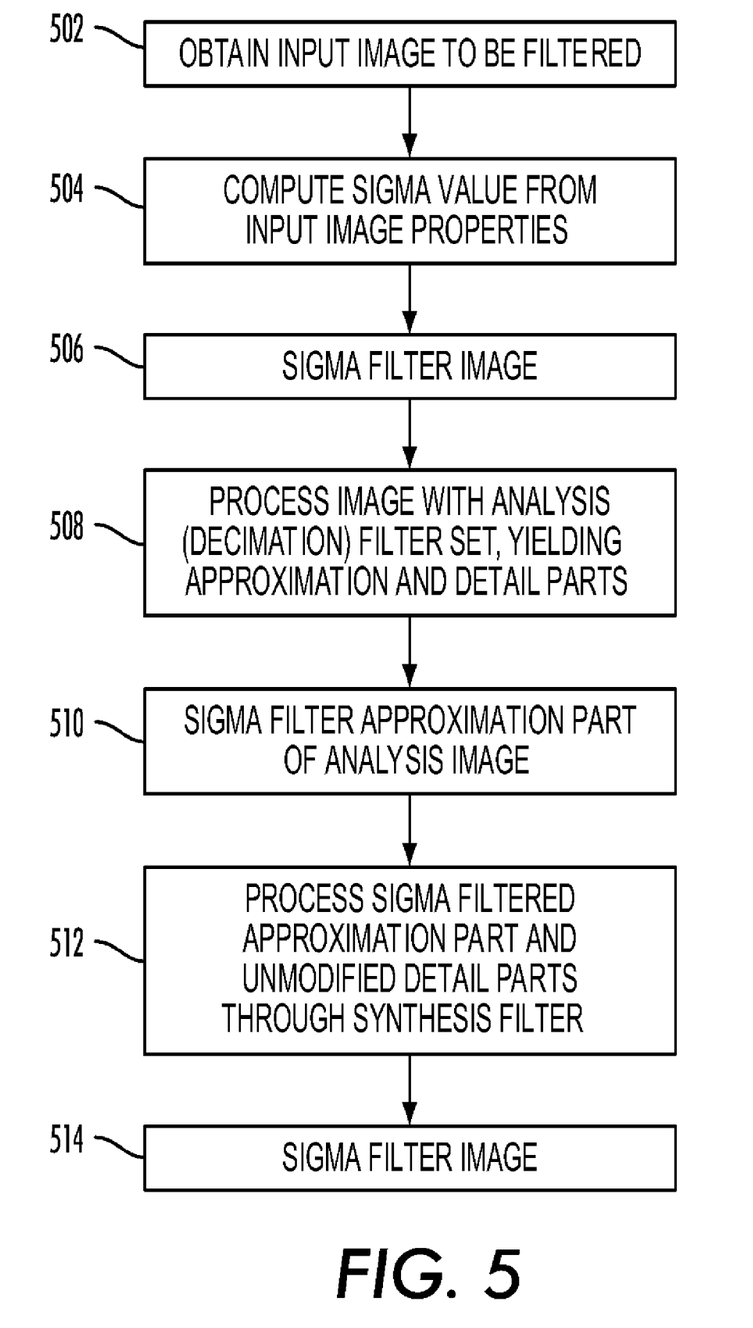
FIG. 5 is a flowchart showing a process for reducing or eliminating noise in a digital image.

Finally, the process may be implemented in software. Accordingly, as shown in FIG. 5, an image is acquired is acquired at step 502. At step 504, the sigma value to be used in subsequent sigma filtering operations is computed from the input image. As described above, this computation may include some sort of high pass filtering and subsequent variance calculation.

The image is sigma filtered at step 506. The sigma filtering uses a relatively small filter kernel, typically 3×3. After the sigma filtering, the filtered image is processed by an analysis filter, at step 508. The output of the analysis filter is four subimages—one approximation part and three detail part. All the subimages are decimated by 2, the subimages are ½ the resolution of the input image. It is noted that when combined, the subimages contain all of the information in the original image, but distributed between the four sub images.

Processing continues with a sigma filter applied to the approximation part of the output at step 508. The detail parts that are output from the processing at step 508 are left untouched at this stage. At step 510, the approximation part is again sigma filtered. At step block 512, the sigma filtered approximation part and the three detail parts are recombined in a synthesis filter.

The synthesis filter kernel is the quatrature mirror pair of the analysis filter kernels at step 508. Afterwards, the output of the synthesis, at step 512, may be optionally sigma filtered one more time at step 514.

It is possible to extend the processing in FIG. 5 to multiple stages as well. In this case, a number of analysis stages are cascaded followed by an identical number of synthesis stages. The number of stages to be used depends on the level of detail to preserve and the computational burden that multiple stages impose.

A method for improving the quality of a digital image by obtaining a digital image; sigma filtering the image to produce a filtered input image; analysis processing the sigma filtered input image to produce an approximation part and a detail part; sigma filtering the approximation part to produce a filtered approximation part; and synthesizing the filtered approximation part and the detail part to generate a reconstructed filtered image. The synthesizing of the filtered approximation part and the detail part may include analysis processing the filtered approximation part to produce a second approximation part and a second detail part; sigma filtering the second approximation part to produce a second filtered approximation part; synthesizing the second filtered approximation part and the second detailed part to produce a first reconstructed image; and synthesizing the first reconstructed image and the first detail part to produce a final filtered image. It is noted that the first reconstructed image may be sigma filtered prior to synthesizing the first reconstructed image and the first detail part to produce a final filtered image.

A sigma value for the sigma filtering for each image can be determined. The determining of the sigma value high pass filters the image; determines a standard deviation of the high pass filtered image; and uses the determined standard deviation as the sigma value wherein the determined standard deviation is used as the sigma value when the determined standard deviation is less than a predetermined value.

A system for improving the quality of a digital image may include a first sigma filtering circuit to sigma filter an image to produce a filtered image; an analysis circuit to process the sigma filtered image to produce an approximation part and a detail part; a second sigma filter circuit to filter the approximation part to produce a sigma filtered approximation part; and a synthesizer to combine the sigma filtered approximation part and the detail part to generate a reconstructed filtered image.

The system may further include a sigma circuit, operatively connected to said first and second sigma filter circuits, to determine a sigma value from the image. The sigma circuit may include a high pass filter circuit to high pass filter the image and a circuit to determine a standard deviation of the high pass filtered image, the determined standard deviation being the sigma value wherein the determined standard deviation is used as the sigma value when the determined standard deviation is less than a predetermined value.

It is noted that the filter circuit and the synthesizer may form a quadrature mirror pair.

Another system for improving the quality of a digital image may include a first sigma filtering circuit to sigma filter an image to produce a filtered image; a first analysis circuit to process the sigma filtered image to produce an approximation part and a detail part; a second sigma filter circuit to filter the approximation part to produce a sigma filtered approximation part; a second analysis circuit to process the sigma filtered approximation part to produce a second approximation part and a second detail part; a third sigma filter circuit to sigma filter the second approximation part to produce a sigma filtered second approximation part; a first synthesizer to synthesize the sigma filtered second approximation part and the second detailed part to produce a first reconstructed image; and a second synthesizer to synthesize the first reconstructed image and the first detail part to produce a final filtered image.

It is noted that the first filter circuit and the first synthesizer may form a quadrature mirror pair, and the second filter circuit and the second synthesizer may form a quadrature mirror pair.

A sigma circuit may be used to determine a sigma value from the image. The sigma circuit may include a high pass filter circuit to high pass filter the image; and a circuit to determine a standard deviation of the high pass filtered image, the determined standard deviation being the sigma value wherein the determined standard deviation is used as the sigma value when the determined standard deviation is less than a predetermined value.

A fourth sigma filter to sigma filter the first reconstructed image to produce a filtered first reconstructed image may be included wherein the second synthesizer synthesizes the filtered first reconstructed image and the first detail part to produce a final filtered image.

As discussed above, the noise within the image data needs to be detected/determined to enable proper sigma filtering wherein the sigma filtering enables noise removal.

Figure 6:
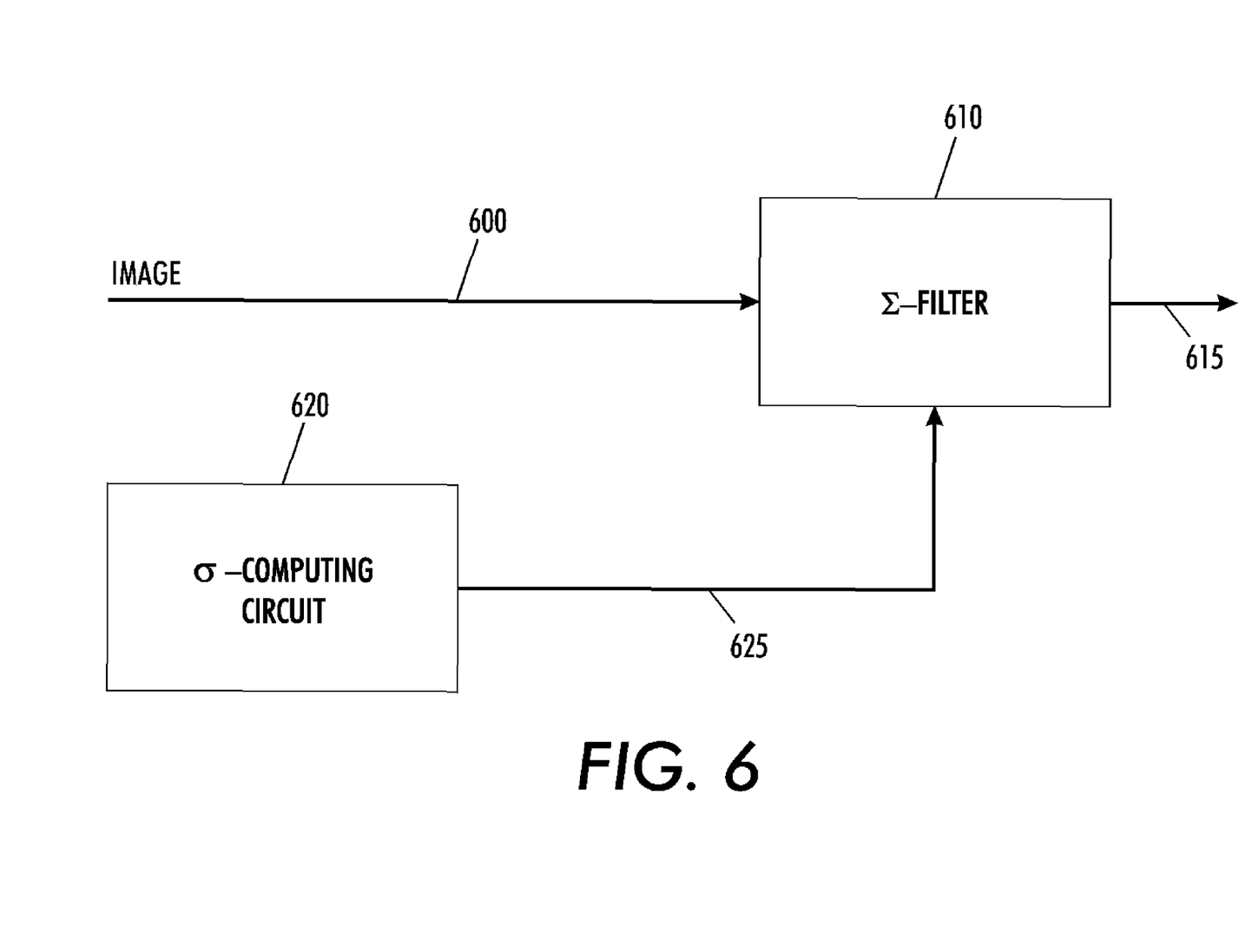
FIG. 6 illustrates a block diagram of a noise detection and filtering system.

As illustrated in FIG. 6, image data 600 is received by σ-computing circuit 620. σ-computing circuit 620 determines the noise within the image data so as to calculate the σ value 625 to be used by the Σ-filter 610. As noted above, the Σ-filter 610 uses the σ value 625 to filter the noise from the image data 600 to generate filtered image data 615.

Automatic noise removal requires the determination of the noise level in a given image. This detected noise level can be used to set parameters of a sigma filter that is applied to the image. Accurate determination of the noise level ensures that image noise is effectively attenuated, while allowing the image content to be virtually unaffected.

Conventionally, the noise is measured by calculating the sample standard deviation of a high pass filtered version of the image. The problem is that this estimate is highly contaminated by image content. A threshold could be used to ignore very large deviations, but the estimated sigma becomes very sensitive to this threshold. Thus, as noted previously, an alternate technique for determining the noise level present in a document is desired.

An alternate process for determining the noise level present in a document utilizes an underlying Laplacian model for noise. This alternative process estimates the standard deviation from an estimate of the mean of the absolute value of the noise. This alternative process is much less sensitive to image content than calculating the sample standard deviation of a high pass filtered version of the image.

Additionally, this alternative process, as explained in more detail below, may combine several estimates of the mean to further reduce the noise estimate in the presence of strong image content.

Figure 7:
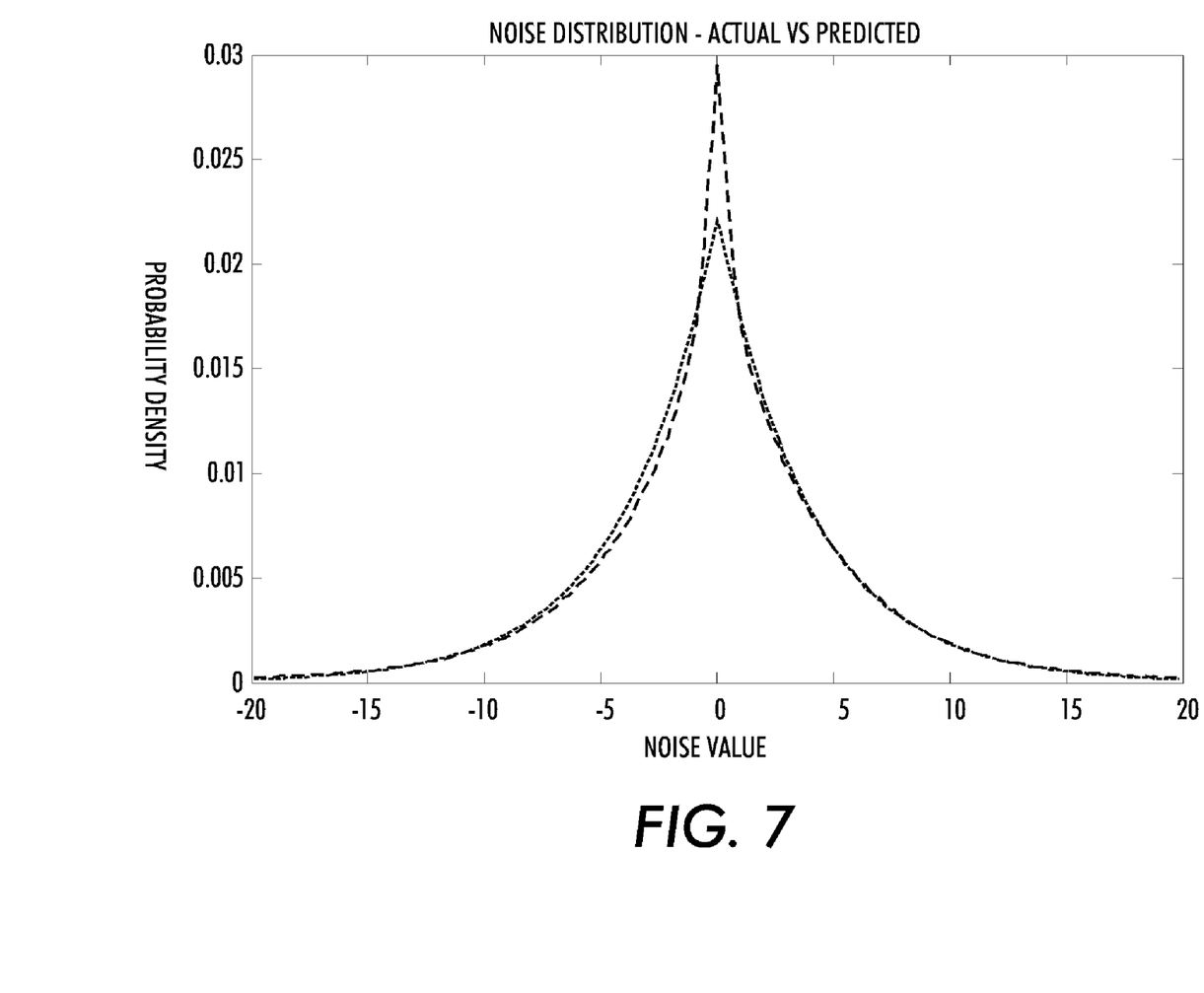
FIG. 7 graphically illustrates actual versus prediction noise distribution.

The process for determining the noise level present in a document uses the properties of the noise distribution to help estimate the sigma value. For many image capturing devices that use charged coupled device (CCD) based technology, such as scanners and digital cameras, the image noise can be modeled using a Laplacian distribution. The noise distribution from a real image and its Laplacian model fit are illustrated in FIG. 7.

Based upon the Laplacian distribution, the noise can be modeled by the following Laplacian function:

$$\text{Lap}(x) = \lambda/2 e^{-\lambda|x|}$$

From this distribution the standard deviation σ can be determined using the following function:

$$\sigma = (2^{1/2})/\lambda$$

If the noise values were available, it would be possible to directly estimate the standard deviation of the noise using:

$$\sigma \approx (\{\Sigma_{i=1:N} \text{noise}^2\}/N)^{0.5}$$

A coarse estimate of the noise values can be obtained by simply high pass filtering the image. Since most image content is low frequency, a high passed version of the image has values of noise and some edge content of the image. The edge content is generally a very small percentage of the image, so most of the high passed filtered image values is the noise of the image.

The direct estimate, as discussed above, is applied to the high pass image to calculate the sample standard deviation (a standard deviation derived from the square root of the sample variance). A problem with this technique is that the process is very sensitive to errors included in the calculation. The errors materialize because the process assumes that the large image values are noise values when in actuality, the large image values may be image content.

It is noted that it is sometimes difficult to distinguish between large image values and noise values. Even though only a few image content edge pixels will be included in the calculation, a few large noises incorrectly added to the calculation could cause a significant error in the noise level estimation.

To avoid or reduce the error in the noise level estimation, the process may, alternatively, utilize the distribution of the absolute values of the noise. In this process, the negative noise values become positive, and the distribution changes from a Laplacian (double sided exponential) distribution to an exponential distribution which can be define as:

$$\text{Exp}(x) = \lambda e^{-\lambda x}$$

Utilizing the exponential distribution, a mean value and variance value can be calculated as follows:

$$\text{Mean} = \lambda^{-1}$$

$$\text{Variance} = \lambda^{-2}$$

Therefore, the standard deviation, $((2^{1/2})/\lambda)$, of a Laplacian distribution, which is being measured, can be determined by calculating the mean of the exponential distribution and multiplying it by the scalar value, $(2^{1/2})$.

Thus, using a high pass filtered image as an estimate of the noise, the mean of the exponential distribution can be found by adding up the absolute values of the image pixels and then dividing by the number of pixels included in the sum. In other words, the mean of the exponential distribution can be defined as follows:
, i.e.

$$\lambda^{-1} \approx \text{Calculated Mean} = \{\Sigma_{i=1:N}|\text{High pass image}|\}/N$$

$$\sigma \approx \text{Calculated Mean} * (2^{1/2})$$

This estimate of the Laplacian distribution is much less sensitive to any large image signal which may be included in the calculation because by adding in a large number, the result changes much less significantly than adding in the square of a large number.

For example, the sample had eleven noise values, five values which have the value of 3, five values which have the value of −3, and one value which has the value of 20, wherein the value of 20 is really image data and should not have been included in the sample. Based upon this example, the sample RMS would be 6.67 and the sample abs mean would be 4.5.

While both numbers are greater than the value of 3, the actual standard deviation, the absolute mean calculation method provides a result that is much closer to the actual value.

The above-described process is highly reliable when the actual input distribution is Laplacian. However, if a distribution, which comes in, is non-Laplacian, a false noise level may be detected because a non-Laplacian distribution is typically associated more with the image content than with noise. Thus, the actual noise level is much smaller than the standard deviation estimate determined by the above described process.

In view of the possibility of detecting a false noise level, it is desirable to detect a non-Laplacian distribution so that the estimated standard deviation is not calculated using the above described process.

An alternative method to detecting the noise level and reducing the possibility of detecting a false noise level is to determine if the distribution of the absolute high pass image is actually exponential. The determination of the distribution of the absolute high pass image being actually exponential can be done by keeping track of more than one mean estimate.

Figure 8:
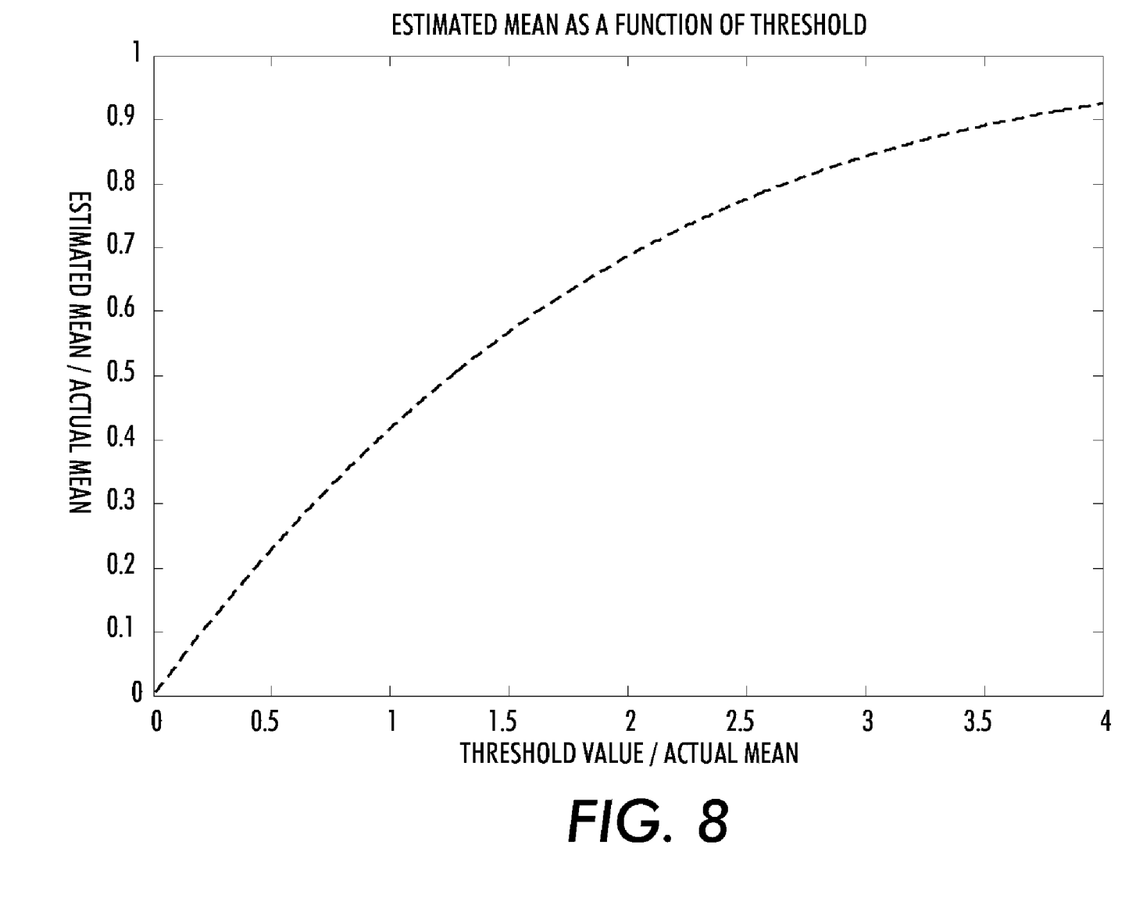
FIG. 8 graphically illustrates an estimated mean value as a function of a threshold value.

In this alternative process, several mean estimates are calculated, wherein each mean estimate includes only those absolute values less than a predetermined threshold in its calculation. FIG. 8 illustrates a graph that shows a ratio of the estimated mean to the actual mean as a function of a threshold value. As illustrated in FIG. 8, the ratio goes asymptotically to 1 as the threshold value increases.

It is noted that if several mean estimates are available for the noise wherein each estimate was determined using a threshold value larger than the noise (the part of the curve of FIG. 8 where the abscissa is greater than 1), the mean estimates can be combined to produce an accurate noise estimate.

For example, if the mean of the absolute value of the noise is known to be less than a predetermined maximum, N, multiple mean estimates could be taken wherein each estimate uses a threshold set to an integer multiple of the maximum absolute value, N. In other words, each mean estimate could be calculated as follows:

$$\mu_k = E\{x | x < k*N\}$$

More specifically, for example, $\mu_5$ only finds the mean of the pixel values which are less than 5*N.

Upon calculating the various estimated mean values, certain mean estimates can be combined to calculate a combined mean value. The combined mean value can be calculated as follows:

$$M_k = 2*\mu_{k+1} - \mu_k$$

Figure 9:
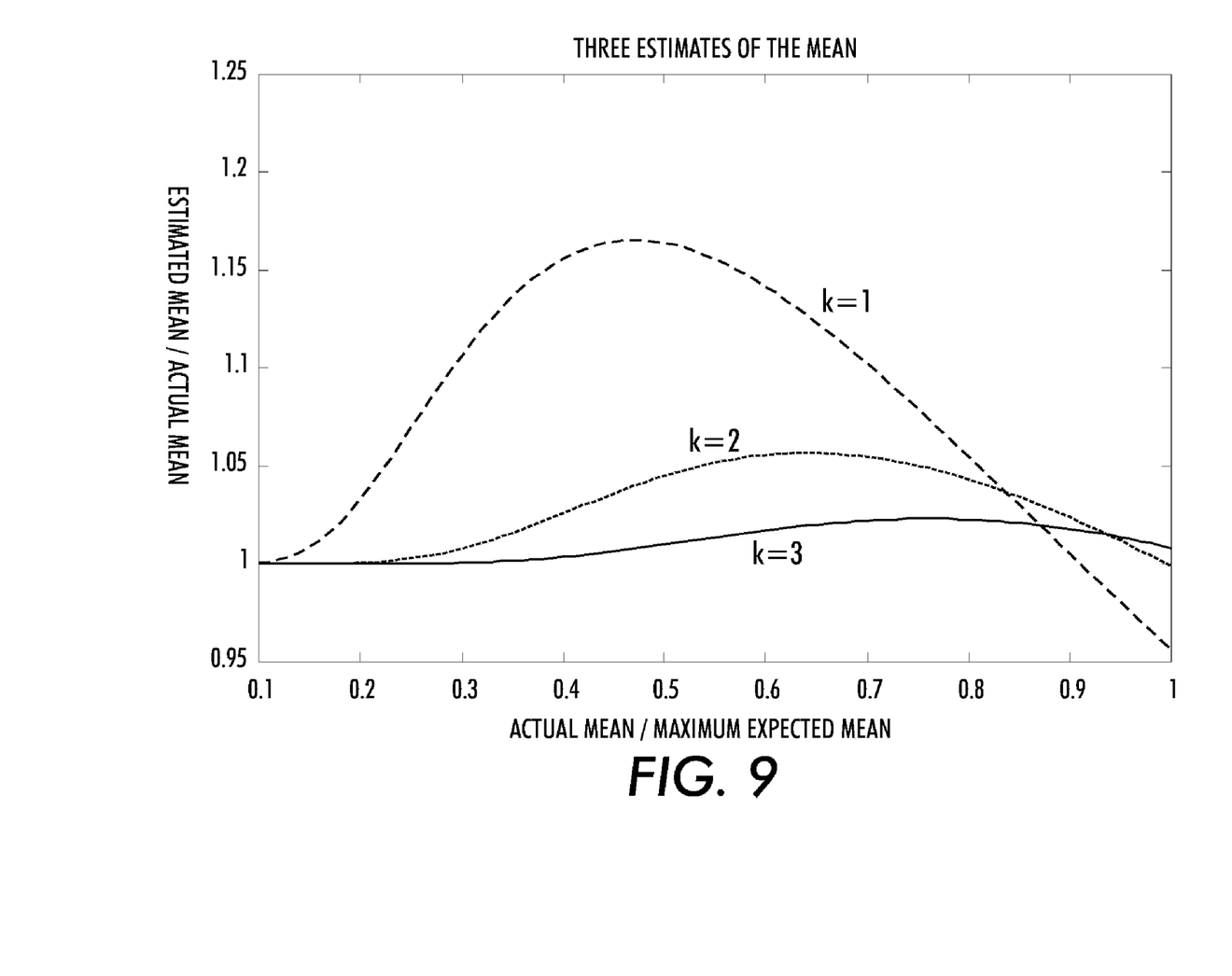
FIG. 9 graphically illustrates examples of estimated mean values.

FIG. 9 illustrates an example wherein three combined mean values have been determined. In FIG. 9, the three combined mean values are illustrated as three different curves of M wherein the underlying distribution is exponential. As illustrated in FIG. 9, it is noted that all of the determined mean estimates are relatively accurate—the determined mean estimates are all within about 15% of the actual mean that is being estimated.

Optionally, these combined mean values can be further combined into a single final estimate. The single final estimate is determined by multiplying the minimum estimate by 2 and subtracting the maximum estimate therefrom. In other words, single estimate is determined as follows:

$$M_{final} = 2*\min(\mu_k) - \max(\mu_k)$$

Figure 10:
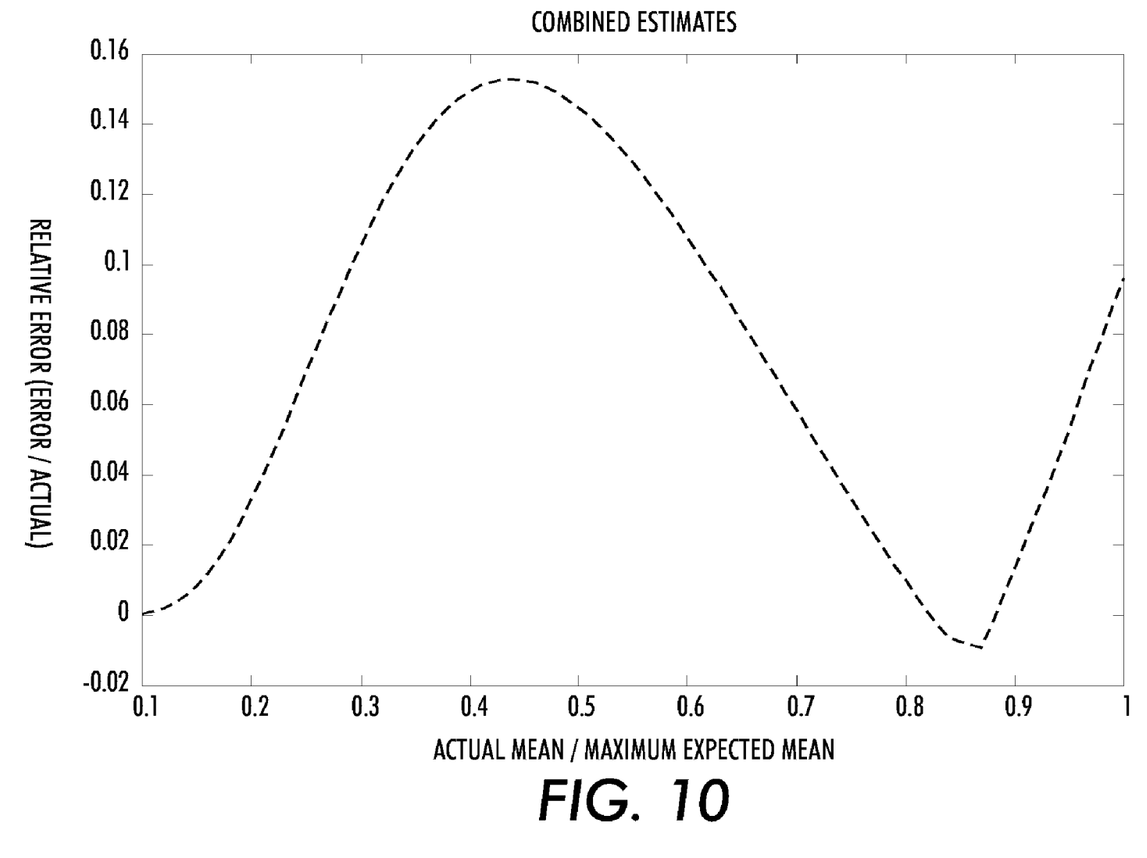
FIG. 10 graphically illustrates an example of combined mean values.

FIG. 10 illustrates a curve that shows the accuracy of this final measurement utilizing the example of the three combined estimates of FIG. 9 wherein the underlying distribution is exponential.

In this example, the final estimated mean is relatively accurate—about 15% error with respect to the actual mean value in the worst case. Alternatively, if more accuracy is desired, this error could be corrected for by applying a predetermined function to the measured mean value (if less than 0.9 of the maximum) to restore the original value.

The estimate process described above will result in much smaller estimates of the mean value, and thus, the estimated standard deviation is much smaller, when the underlying distribution is non-Laplacian. By calculating a smaller estimated standard deviation, images with significant edge content and low noise will not be significantly filtered, thereby avoiding or reducing deleterious image degradation.

Figure 11:
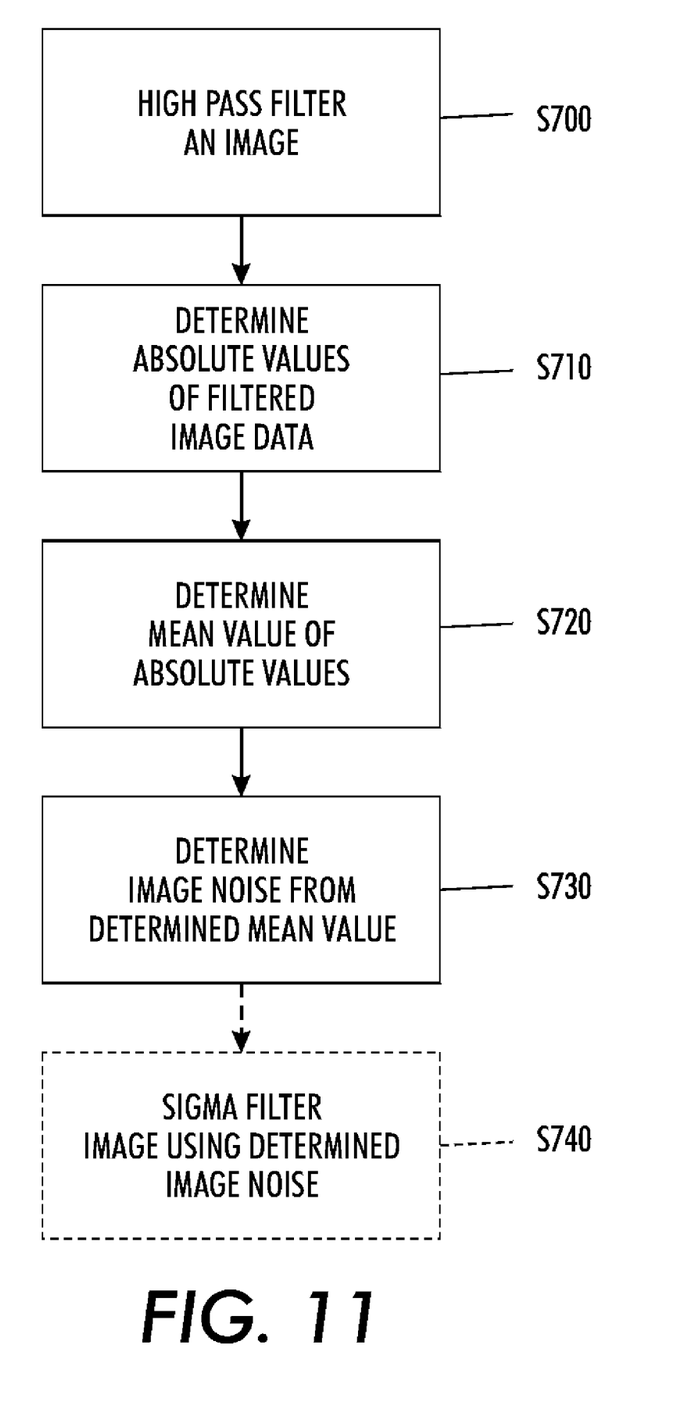
FIG. 11 through 13 illustrate exemplary flowcharts of determining image noise within image data.

FIG. 11 illustrates a flowchart of one process for determining the noise level of image data. As illustrated in FIG. 11, image data is high pass filtered at Step S700. Absolutes values of the high pass filtered image data are determined at Step S710. At Step S720, the mean value of the absolute values is determined. Based upon the determined mean value, the noise of the image is determined at Step S730. This noise can be optionally used by a sigma filter, at Step S740, to sigma filter the image data.

Figure 12:
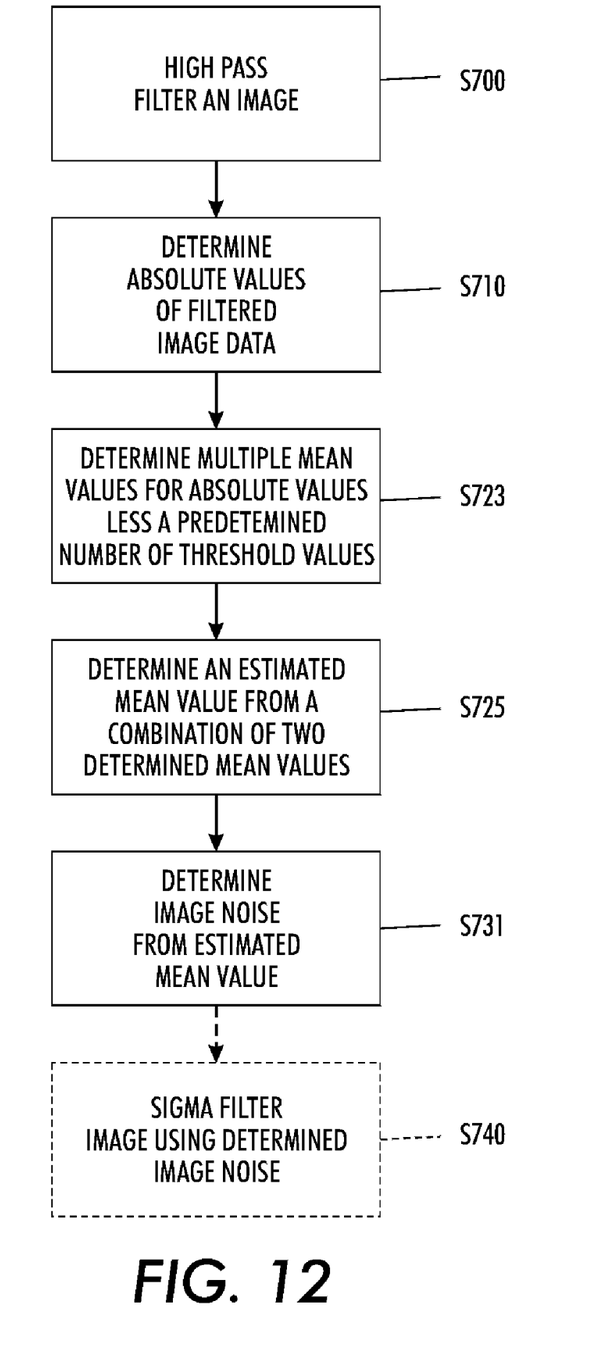

FIG. 12 illustrates a flowchart of another process for determining the noise level of image data. As illustrated in FIG. 12, image data is high pass filtered at Step S700. Absolutes values of the high pass filtered image data are determined at Step S710. At Step S723, multiple mean values for absolute values less than a predetermined number of threshold values are determined. Based upon the determined mean values, an estimated mean value from a combination of two determined mean values is calculated, at Step S725. At Step S731, the noise of the image is determined from the estimated mean value. This noise can be optionally used by a sigma filter, at Step S740, to sigma filter the image data.

Figure 13:
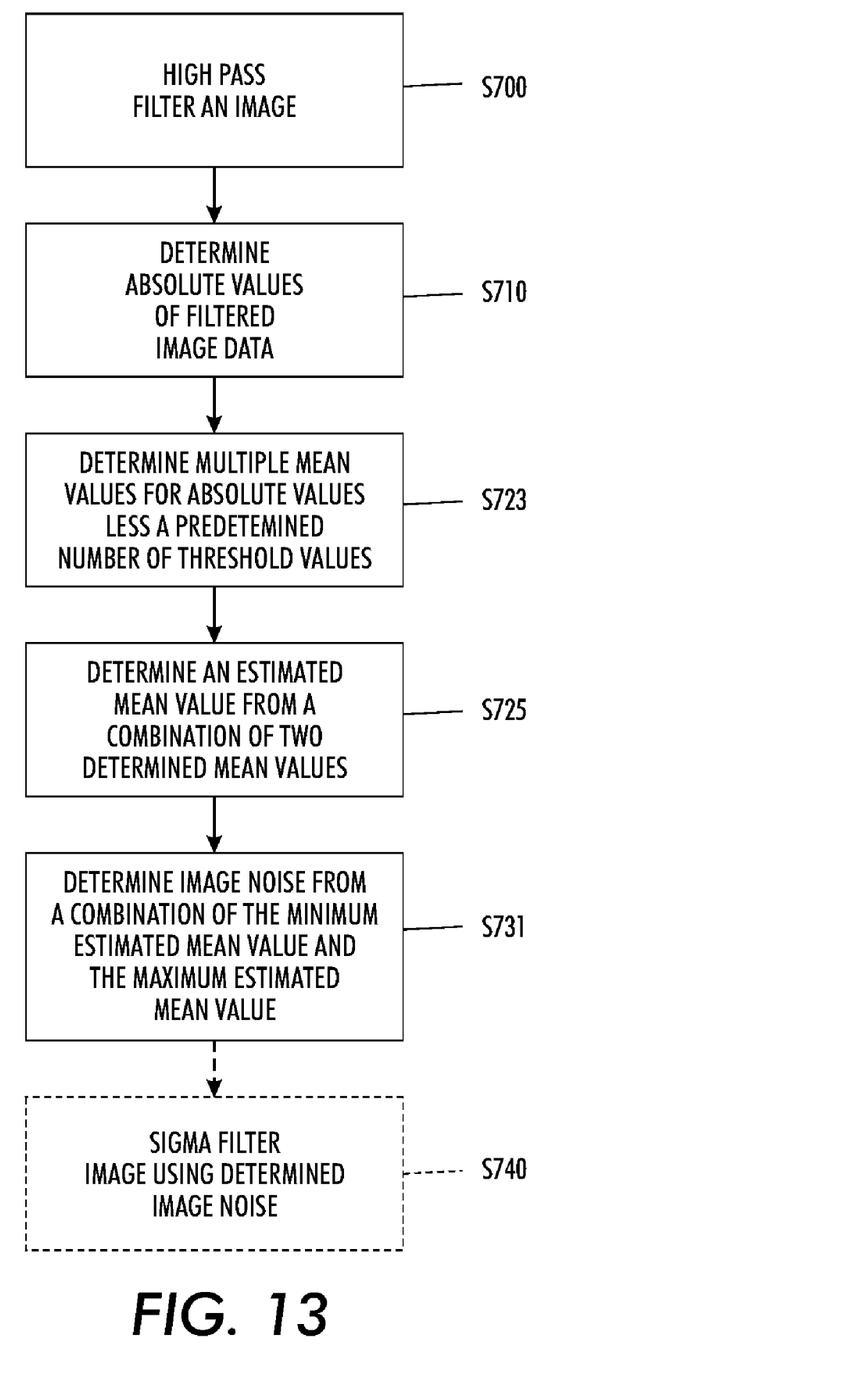

FIG. 13 illustrates a flowchart of another process for determining the noise level of image data. As illustrated in FIG. 12, image data is high pass filtered at Step S700. Absolutes values of the high pass filtered image data are determined at Step S710. At Step S723, multiple mean values for absolute values less than a predetermined number of threshold values are determined. Based upon the determined mean values, a plurality of estimated mean values is calculated, each estimated mean value being calculated from a combination of two determined mean values, at Step S725. At Step S733, the noise of the image is determined from a combination of the minimum estimated mean value and the maximum estimated mean value, as determined at Step S725. This noise can be optionally used by a sigma filter, at Step S740, to sigma filter the image data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for filtering image data, comprising:
    (a) obtaining a digital image;
    (b) high pass filtering the image data;
    (c) determining absolutes values of the high pass filtered image data;
    (d) determining a mean value of the absolute values; and
    (e) determining, based upon the determined mean value, the noise of the image;
    (f) sigma filtering the image, using the determined noise, to produce a sigma filtered input image;
    (g) analysis processing the sigma filtered input image to produce an approximation part and a detail part;
    (h) sigma filtering the approximation part to produce a sigma filtered approximation part; and
    (i) synthesizing the sigma filtered approximation part and the detail part to generate a reconstructed filtered image.

2. The method as claimed in claim 1, wherein synthesizing the filtered approximation part and the detail part comprises:
    (i1) analysis processing the sigma filtered approximation part to produce a second approximation part and a second detail part;
    (i2) sigma filtering the second approximation part to produce a sigma filtered second approximation part;
    (i3) synthesizing the sigma filtered second approximation part and the second detailed part to produce a first reconstructed image; and
    (i4) synthesizing the first reconstructed image and the first detail part to produce a final filtered image.

3. The method as claimed in claim 1, wherein the analysis processing of the sigma filtered input image and the synthesizing of the sigma filtered approximation part and the detail part have a quadrature mirror pair relationship.

4. The method as claimed in claim 1, further comprising determining a sigma value for the sigma filtering for each image.

5. The method as claimed in claim 1, wherein the determining of the sigma value comprises:
    high pass filtering the image;
    determining a standard deviation of the high pass filtered image; and using the determined standard deviation as the sigma value.

6. The method as claimed in claim 5, wherein the determined standard deviation is used as the sigma value when the determined standard deviation is less than a predetermined value.

7. The method as claimed in claim 2, further comprising:
(i3a) sigma filtering first reconstructed image prior to synthesizing the first reconstructed image and the first detail part to produce a final filtered image.

8. The method as claimed in claim 1, wherein said determining a mean value of the absolute values comprises:
(c1) determining, using a predetermined number of threshold values, multiple mean values of the absolute values, each mean value being calculated using absolutes values less than a predetermined threshold value; and
(c2) determining, based upon the determined mean values, an estimated mean value, the estimated mean value being a combination of two of the multiple mean values;
said determining the noise of the image being based upon the determined estimated mean value.

9. The method as claimed in claim 8, wherein the estimated mean value is calculated by multiplying a first mean value by two and subtracting a second mean value, wherein the first mean value is a mean value calculated from absolute values less than K*N and the second mean value is a mean value calculated from absolute values less than (K−1)*N wherein K is an integer and N is a predetermined maximum absolute value.

10. The method as claimed in claim 1, wherein said determining a mean value of the absolute values comprises:
(c1) determining, using a predetermined number of threshold values, multiple mean values of the absolute values, each mean value being calculated using absolutes values less than a predetermined threshold value;
(c2) determining, based upon the determined mean values, an estimated mean value, the estimated mean value being a combination of two of the multiple mean values; and
(c3) determining a final estimated mean value, the final estimated mean value being calculated by multiplying a maximum estimated mean value by two and subtracting a minimum estimated mean value;
said determining the noise of the image being based upon the determined estimated mean value.

11. The method as claimed in claim 10, wherein the estimated mean value is calculated by multiplying a first mean value by two and subtracting a second mean value, wherein the first mean value is a mean value calculated from absolute values less than K*N and the second mean value is a mean value calculated from absolute values less than (K−1)*N wherein K is an integer and N is a predetermined maximum absolute value.

12. A system for improving the quality of a digital image comprising:
a first filter to high pass filter the image data;
a mean circuit, operatively connected to said first filter, to determine absolutes values of the high pass filtered image data and to determine a mean value of the absolute values;
a noise level circuit, operatively connected to said mean circuit, to determine, based upon the determined mean value, the noise of the image;
a first sigma filtering circuit, using the determined noise level, to sigma filter an image to produce a sigma filtered image;

an analysis circuit to process the sigma filtered image to produce an approximation part and a detail part;
a second sigma filter circuit to filter the approximation part to produce a sigma filtered approximation part; and
a synthesizer to combine the sigma filtered approximation part and the detail part to generate a reconstructed filtered image.

13. The system as claimed in claim 12, further comprising:
a sigma circuit, operatively connected to said first and second sigma filter circuits, to determine a sigma value from the image.

14. The system as claimed in claim 13, wherein said sigma circuit comprises:
a high pass filter circuit to high pass filter the image; and
a circuit to determine a standard deviation of the high pass filtered image, the determined standard deviation being the sigma value.

15. The system as claimed in claim 14, wherein the determined standard deviation is used as the sigma value when the determined standard deviation is less than a predetermined value.

16. The system as claimed in claim 12, wherein said analysis circuit and said synthesizer form a quadrature mirror pair.

17. The system method as claimed in claim 12, wherein said mean circuit determines, using a predetermined number of threshold values, multiple mean values of the absolute values, each mean value being calculated using absolutes values less than a predetermined threshold value, and determines, based upon the determined mean values, an estimated mean value, the estimated mean value being a combination of two of the multiple mean values;
said noise level circuit determining the noise of the image being based upon the determined estimated mean value.

18. The system as claimed in claim 17, wherein the estimated mean value is calculated by multiplying a first mean value by two and subtracting a second mean value, wherein the first mean value is a mean value calculated from absolute values less than K*N and the second mean value is a mean value calculated from absolute values less than (K−1)*N wherein K is an integer and N is a predetermined maximum absolute value.

19. The system as claimed in claim 13, wherein said mean circuit determines, using a predetermined number of threshold values, multiple mean values of the absolute values, each mean value being calculated using absolutes values less than a predetermined threshold value; determines, based upon the determined mean values, an estimated mean value, the estimated mean value being a combination of two of the multiple mean values; and determines a final estimated mean value, the final estimated mean value being calculated by multiplying a maximum estimated mean value by two and subtracting a minimum estimated mean value;
said noise level circuit determining the noise of the image being based upon the determined estimated mean value.

20. The system as claimed in claim 19, wherein the estimated mean value is calculated by multiplying a first mean value by two and subtracting a second mean value, wherein the first mean value is a mean value calculated from absolute values less than K*N and the second mean value is a mean value calculated from absolute values less than (K−1)*N wherein K is an integer and N is a predetermined maximum absolute value.

* * * * *